J. KITCHIN.
HEAT RETAINING COVER.
APPLICATION FILED JUNE 3, 1908.
908,107.
Patented Dec. 29, 1908.
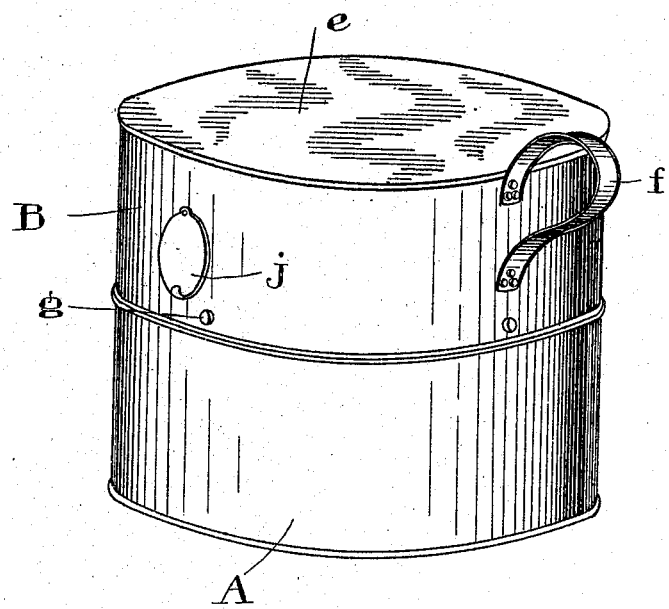
FIG. I.
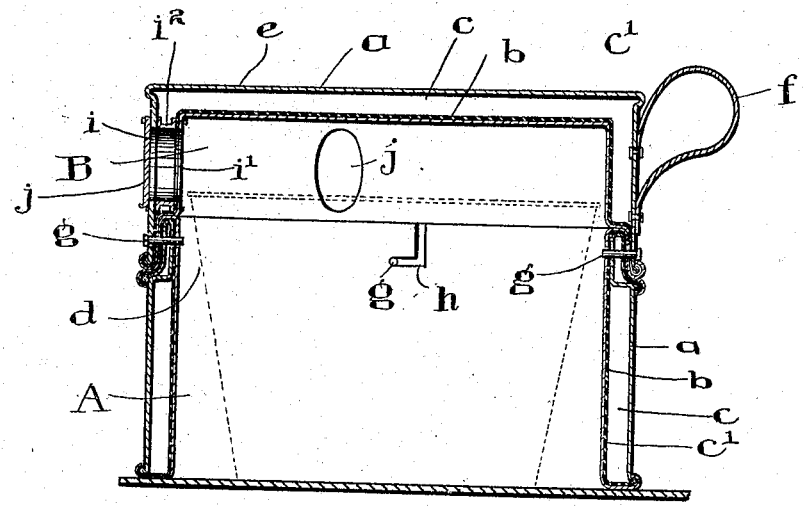
FIG. 2.
WITNESSES
INVENTOR
J. KITCHIN.
BY
ATTY.

UNITED STATES PATENT OFFICE.

JAMES KITCHIN, OF NEW GLASGOW, NOVA SCOTIA, CANADA.

HEAT-RETAINING COVER.

No. 908,107.      Specification of Letters Patent.      Patented Dec. 29, 1908.

Application filed June 3, 1908. Serial No. 436,494.

*To all whom it may concern:*

Be it known that I, JAMES KITCHIN, of New Glasgow, in the Province of Nova Scotia, Canada, have invented certain new and useful Improvements in Heat-Retaining Covers, of which the following is a specification.

My invention relates to improvements in heat retaining devices, and the objects of my invention are to provide a simple device of this class for use on the top of stoves and the like, which can be used to cook or warm foods, to warm dishes or otherwise retain the heat on the inside for similar purposes.

A further object of the invention is to adapt the device for use with different sizes of dishes and to provide means for regulating the heat on the inside; and it consists essentially of a cover formed in a plurality of separable and superimposed sections, and regulating ventilating openings in certain of the sections, all as hereinafter more fully set forth and described in the accompanying specifications and drawings.

In the drawings, Figure 1 is a perspective view of a heat retaining device. Fig. 2 is a sectional view of the same.

In the drawings, like letters of reference indicate corresponding parts in each figure.

Referring to the drawings, it will be seen that the embodiment illustrated shows a heat retaining cover formed of two sections A and B, each consisting of two layers of thin metal, such as tin, $a$ and $b$, spaced apart and formed with a dead air space $c$ between, a layer of asbestos $c'$ or other heat insulating material being provided on the exterior of the inner layer.

The lower section A is annular in form, and provided with an open top, a reduced portion $d$, being provided around the edge and adapted to fit into the bottom of the upper section B.

The upper section B is provided with a top $e$ and a handle $f$. To retain the two sections together, rivets $g$ are provided on the upper member, which are adapted to enter into L-shaped slots $h$ on the lower member. The upper member has also provided therein, openings $i$ and $i'$ formed in both inside and outside layers and insulated from the dead air space by a cylindrical member $i^2$, the opening on the outer layer being closed by a pivoted cover $j$ or other means, the said openings being adapted to serve as ventilators, for the interior, the amount of ventilation being regulated by the size of the opening.

In using the device with a high crock located therein, the two sections are employed, superimposed on each other as indicated in the drawings. Should, however, it be desired to cover a low dish, the upper section alone would be removed and used.

The ventilator enables the temperature of the interior to be adjusted, to suit the purposes for which it is being used.

It will be evident that while I have described the cover as formed of sheet metal and asbestos, it could be formed of any other suitable material, and other changes might be made in the details of the construction, without departing from the spirit of the invention.

What I claim as my invention is:

1. A heat retaining cover adapted to be placed on a stove, including a lower annular member having an opening at the top and bottom, the lower edge of said member being adapted to rest directly on the stove, and an upper member removably and closely fitted to the lower member and being provided with a closed top the said upper member being adapted to be placed on the stove, and used separately as a cover for small dishes.

2. A heat retaining cover adapted to be placed on a stove, including a lower annular member having an opening at the top and bottom, the lower edge of said member being adapted to rest directly on the stove, an upper member removably and closely fitted to the lower member and being provided with a closed top the said upper member being adapted to be placed on the stove and used separately as a cover for small dishes, and means for locking said members together.

3. A heat retaining cover adapted to be placed on a stove, including a lower annular member having an opening at the top and bottom, the lower edge of said member being adapted to rest directly on the stove, an upper member removably and closely fitted to the lower member and being provided with a closed top, each of said members being formed of two thicknesses of metal with a dead air space between the said upper member being adapted to be placed on the stove, and used separately as a cover for small dishes.

In witness whereof I have hereunto set my hand in the presence of two witnesses.

JAMES KITCHIN.

Witnesses:
    JOHN A. BRENNAN,
    KENNETH J. MACKENZIE.